United States Patent
Hikita et al.

(10) Patent No.: US 6,496,624 B1
(45) Date of Patent: Dec. 17, 2002

(54) OPTICAL WAVEGUIDE DEVICE FOR OPTICAL WIRING AND MANUFACTURING METHOD THEREFOR

(75) Inventors: Makoto Hikita, Tokyo (JP); Satoru Tomaru, Tokyo (JP); Koji Enbutsu, Tokyo (JP); Saburo Imamura, Tokyo (JP); Michiyuki Amano, Tokyo (JP); Shun-ichi Tohno, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 09/290,389

(22) Filed: Apr. 13, 1999

(30) Foreign Application Priority Data

Apr. 14, 1998 (JP) .......................................... 10-103174

(51) Int. Cl.[7] ................................................. G02B 6/26
(52) U.S. Cl. .............................. 385/50; 385/49; 385/52; 385/59
(58) Field of Search ............................. 385/50, 49, 51, 385/52, 59, 57; 425/143

(56) References Cited

U.S. PATENT DOCUMENTS 5,265,184 A    11/1993  Lebby et al.
5,371,820 A  * 12/1994  Welbourn et al. ........... 385/130

(List continued on next page.)

FOREIGN PATENT DOCUMENTS

JP    60-156021   8/1985
JP     6-224079   9/1993

(List continued on next page.)

OTHER PUBLICATIONS

K.H. Hahn, et al., "Gigabyte/s Data Communications with the POLO Parallel Optical Link," 1996 Electronic Components and Technology Conference, pp. 301–307 (1996).

(List continued on next page.)

*Primary Examiner*—Cassandra Spyrou
*Assistant Examiner*—Fayez Assaf
(74) *Attorney, Agent, or Firm*—Burns, Doane, Swecker & Mathis L.L.P.

(57) ABSTRACT

The present invention provides an optical waveguide device for optical wiring, and a manufacturing method therefor, which provides the advantages that simple and highly accurate connection is possible, the device is low in cost, and it is easily manipulated.

The present invention is provided with connectors which are connected to optical fibers in a nonalignment via guide pins, and a polymeric waveguide comprising a film-shaped optical waveguide; the connectors are joined to both ends or to one end of the polymeric waveguide, and the connectors are formed by two connector parts which are arranged in facing position, and in the surfaces of the connector parts which are in facing position, a polymeric waveguide loading groove for loading the polymeric waveguide, and two guide pin loading grooves for loading guide pins are formed, and the polymeric waveguide is sandwiched between the two connector parts, and the polymeric waveguide is joined with the two connector parts and made unitary.

By means of this, it is possible to easily conduct connection with optical fibers, and optical devices, planar optical waveguides, and optical fibers and the like can be connected easily and with a high degree of accuracy. Moreover, the construction is simple, so that it is possible to realize a reduction in cost, and it is possible to increase the ease of manipulation.

11 Claims, 9 Drawing Sheets

U.S. PATENT DOCUMENTS 5,613,024 A * 3/1997 Shahid .................. 385/52
5,732,173 A * 3/1998 Bylander et al. ............ 385/49
6,069,991 A * 5/2000 Hibbs-Brenner et al. ..... 385/50

FOREIGN PATENT DOCUMENTS

| JP | 06-075141 | 3/1994 |
| JP | 08-278429 | 10/1996 |
| JP | 09-166723 | 6/1997 |
| JP | 9-197148 | 7/1997 |
| JP | 11-231165 | 8/1999 |

OTHER PUBLICATIONS

K.H. Hahn, "POLO Parallel Optical Links for Gigabyte Data Communications," the 45$^{th}$ Electronic Components and Technology Conference, pp. 368–375, (1995).

Y. S. Liu, et al., "Optoelectronic Packaging and Polymer Waveguides for Multichip Module and Board–Level Optical Interconnect Applications," the 45$^{th}$ Electronic Components and Technology Conference, pp. 185–188, (1995).

A. Kaneko, et al., "Flexible multimode polymer Waveguides for optical interconnections," POF '96, the Fifth International Conference on Plastic Optical Fibres & Applications, pp. 113–119, (1996).

M. Hikita, et al., "Free–Standing Polymeric Optical Waveguide Films for Optical Interconnections," 11$^{th}$ International Conference on Integrated Optics and Optical Fibre Communications, 23$^{rd}$ European Conference on Optical Communications. Conference Publication No. 448, pp. 285–288, (1997).

M. Hikita, et al., "Polymeric optical waveguides for optical interconnections," Thin Solid Film 331 pp. 303–308, (1998).

M. Hikita, et al., "Polymeric Optical Waveguide Films for Short–Distance Optical Interconnects," Procedings of Workshop on "Fibre Optic Passive Components," pp. 61–64, (1998).

M. Hikita, et al., "Polymeric Optical Waveguides for Optical Interconnections," International Workshop on Nanomolecular Electronics '97, Extended Abstracts pp. 0–17, (1997).

Masao Kawachi, "Current Status and Future Trends in Planar Lightwave Circuit Technologies," NTT R&D, vol. 43, No. 11, pp. 102–108, (1994).

G. Palmskog, et al., "Low–Cost Single–Mode Optical Passive Coupler Devices—With An MT–Interface—Based on Polymeric Waveguides in BCB," 8$^{th}$ European Conference on Integrated Optics and Technical Exhibition. Proceedings, pp. EthF5–1/291–194/EThb5–4, (1997).

* cited by examiner

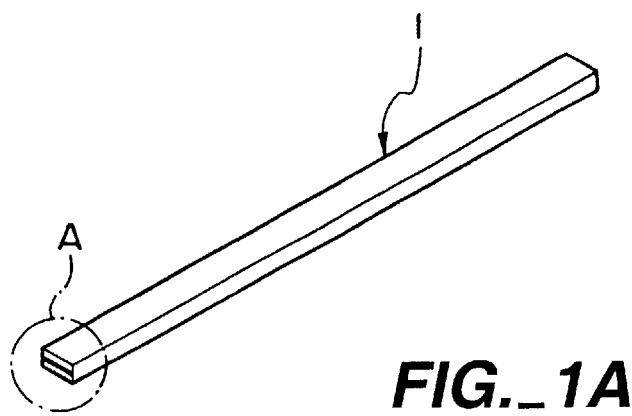
FIG._1A
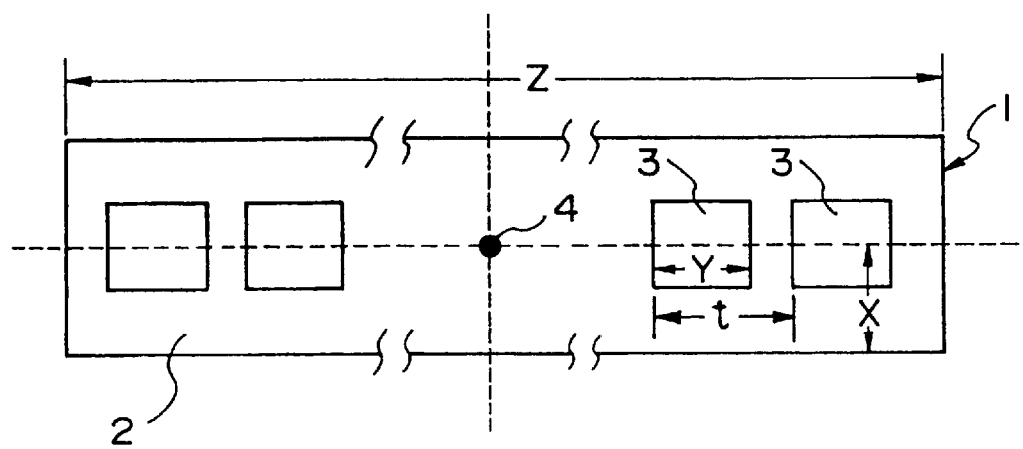
FIG._1B
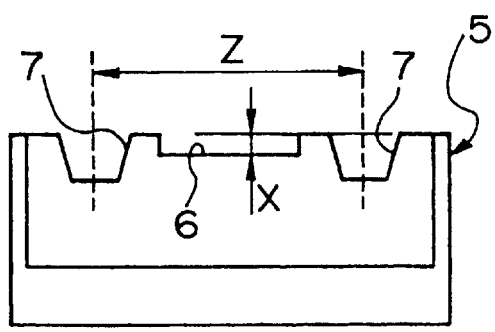
FIG._2A
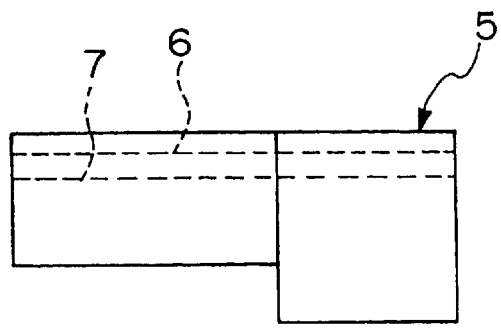
FIG._2B

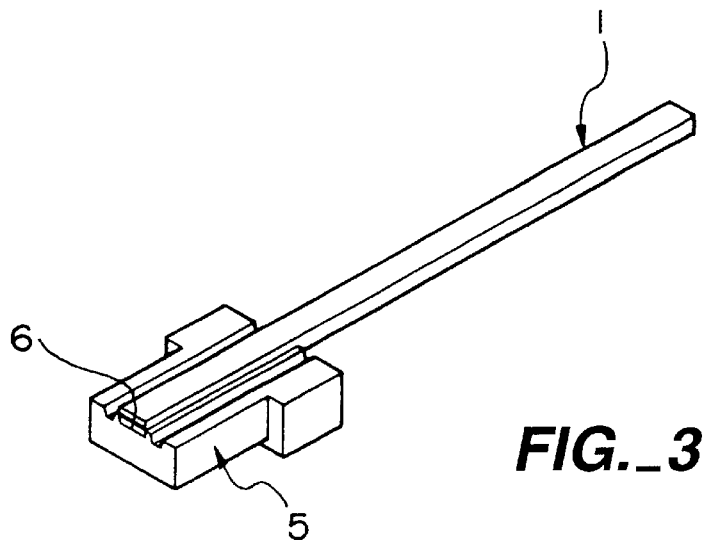
FIG._3
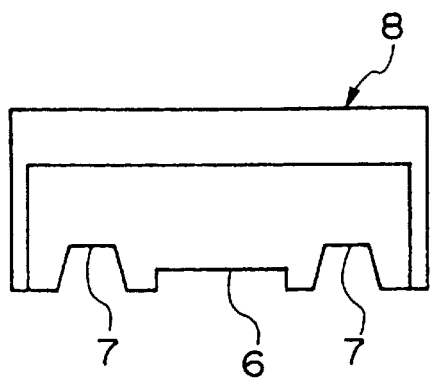
FIG._4A
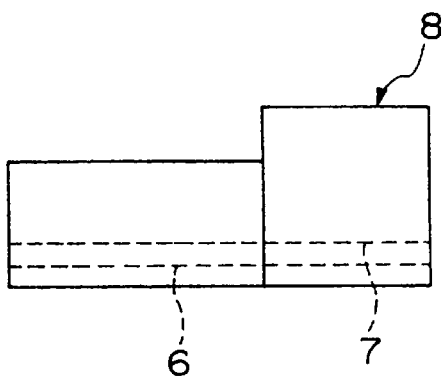
FIG._4B
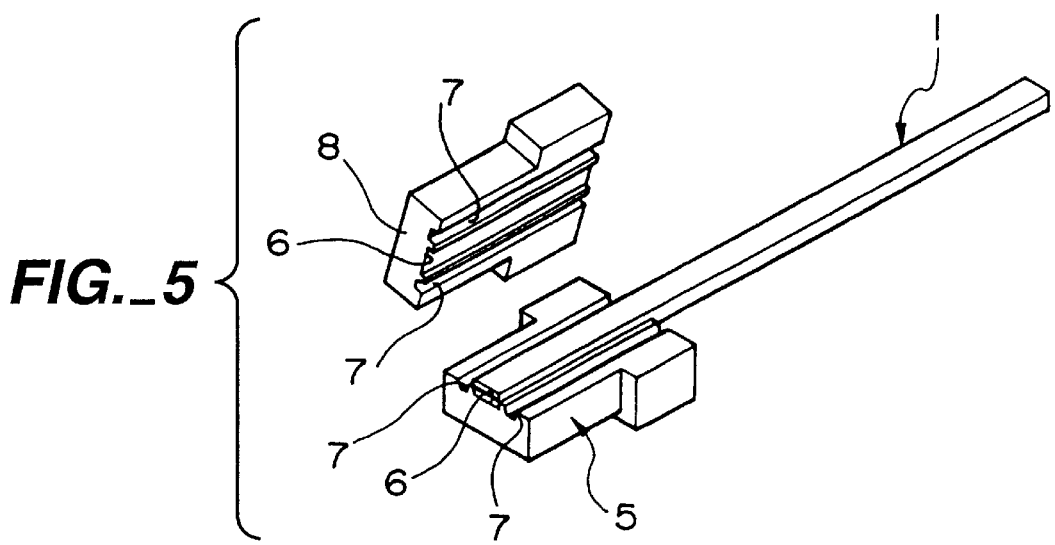
FIG._5

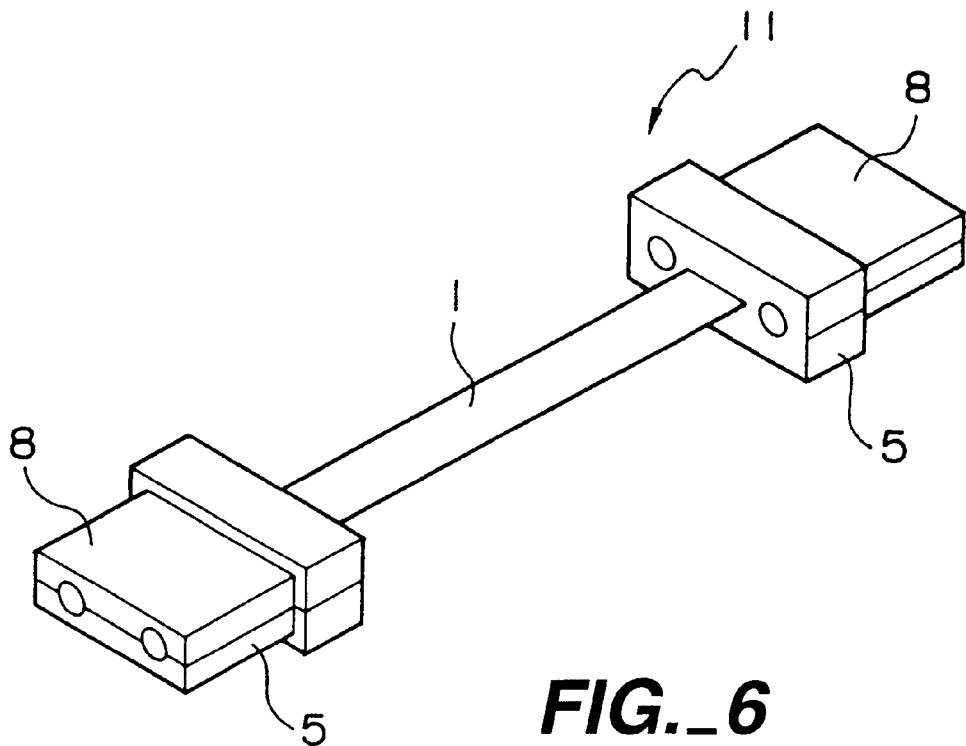
FIG._6
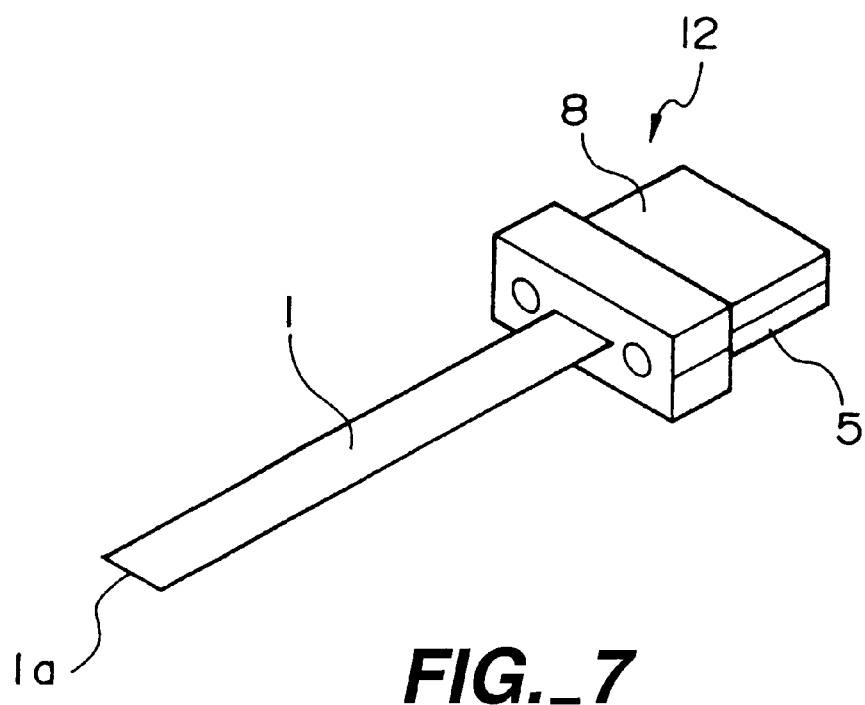
FIG._7

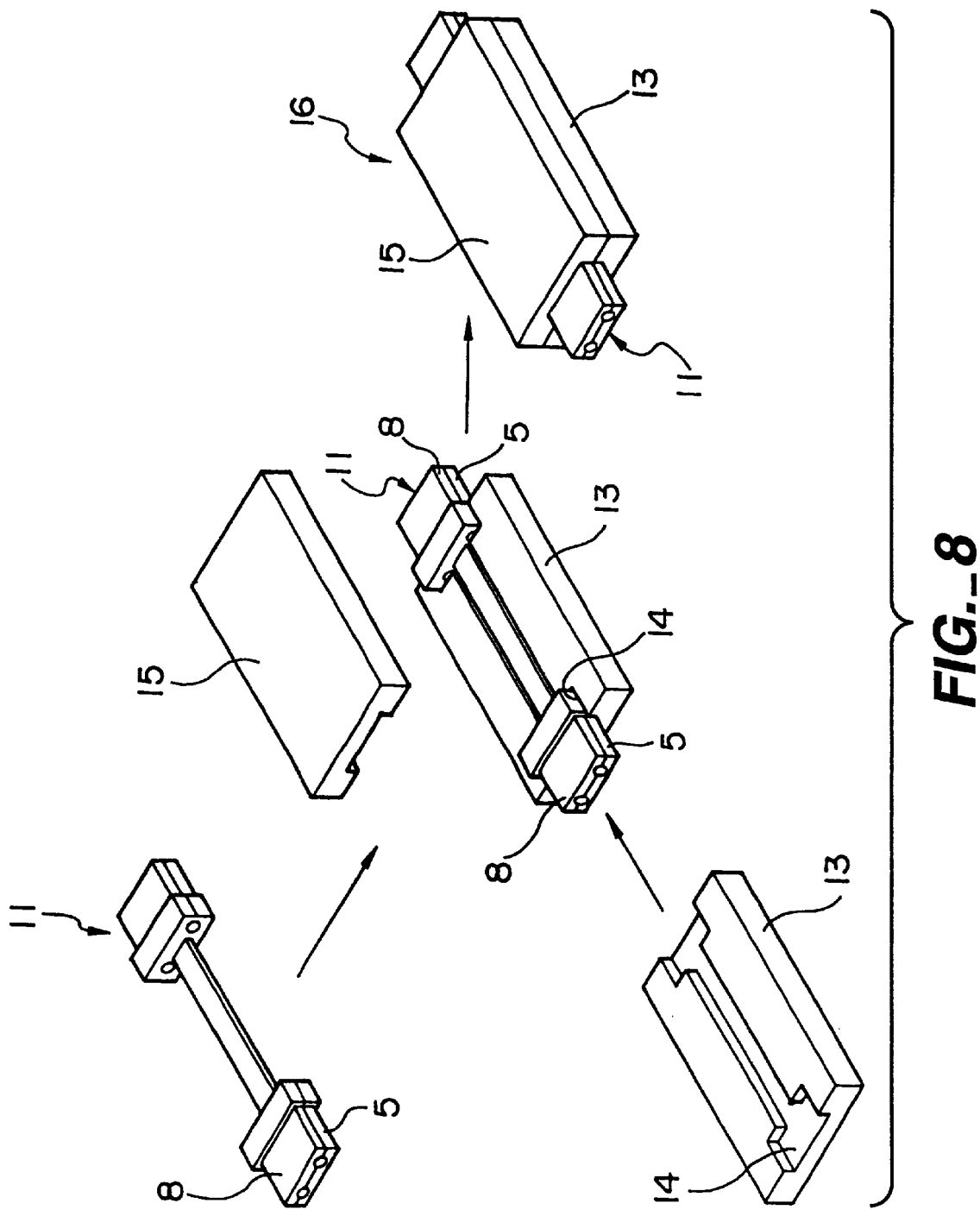
FIG._8

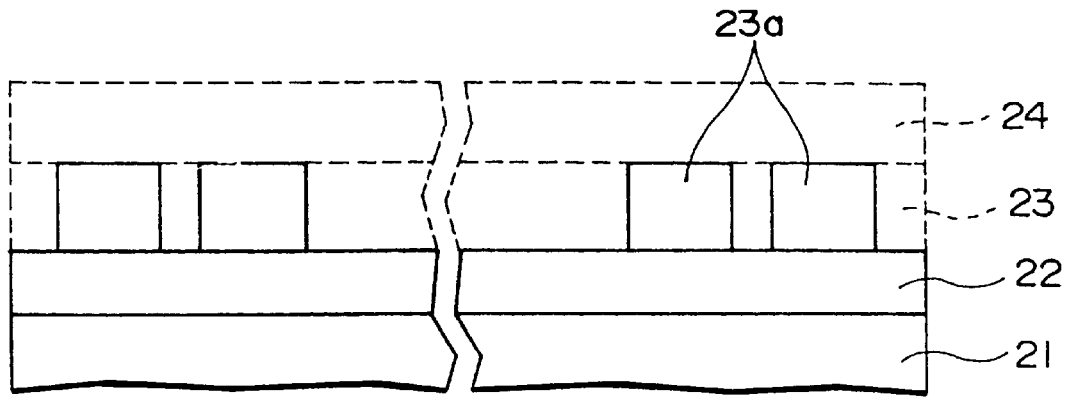
FIG._9
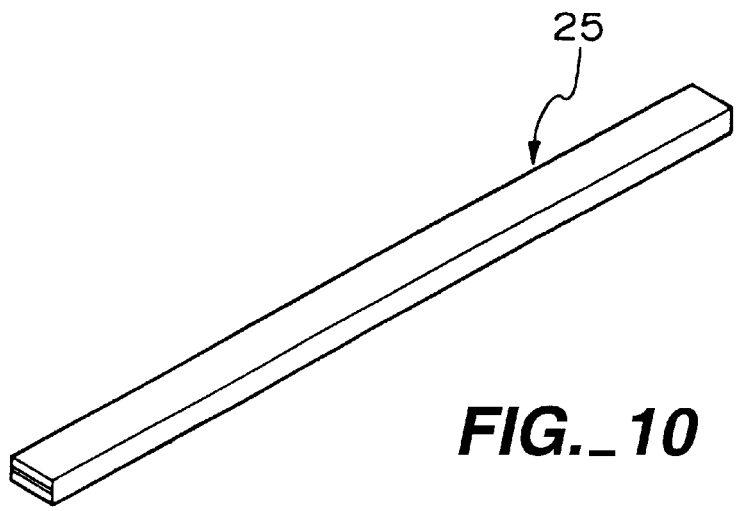
FIG._10
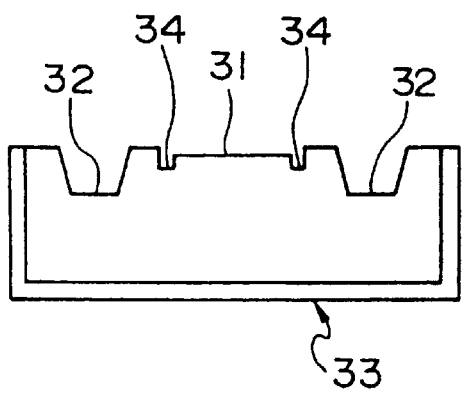
FIG._11A
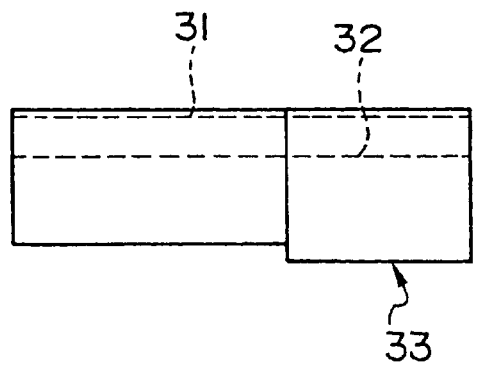
FIG._11B

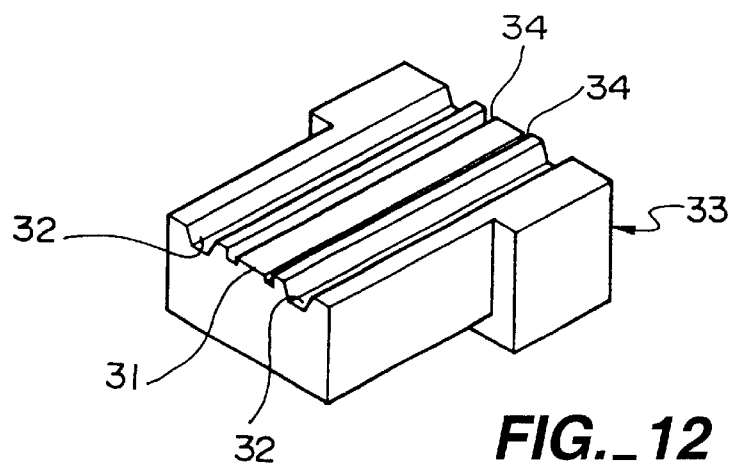
FIG._12
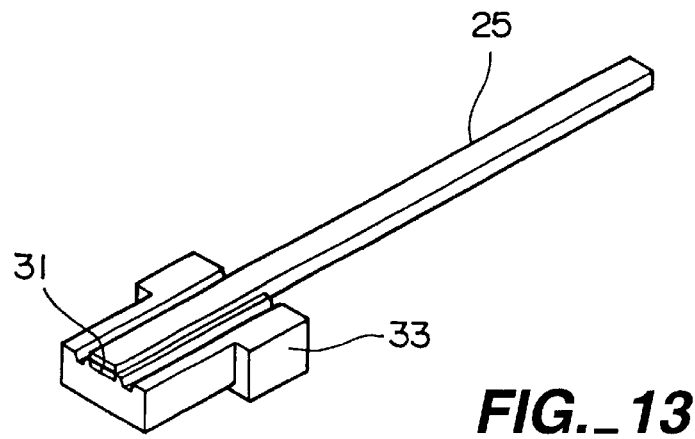
FIG._13
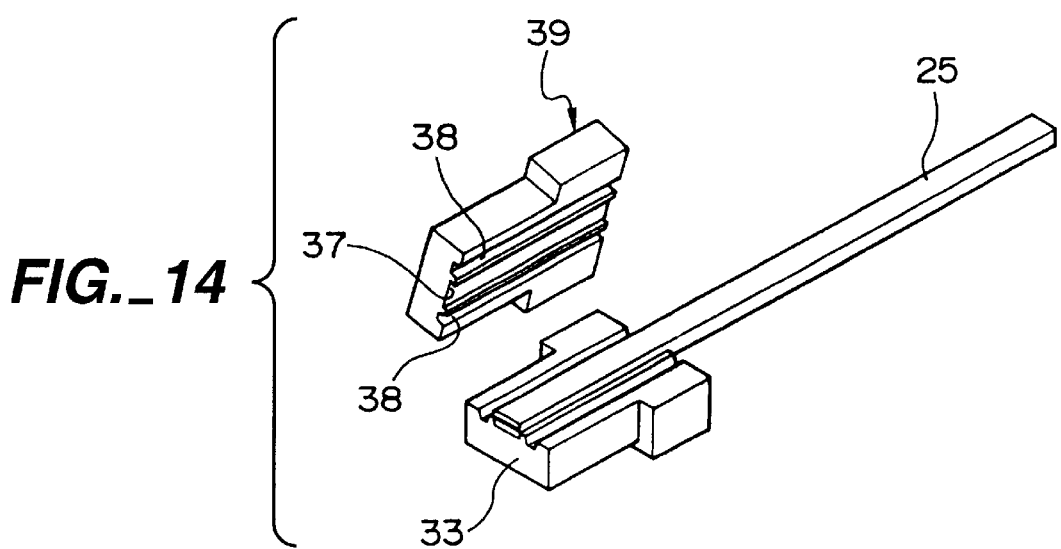
FIG._14

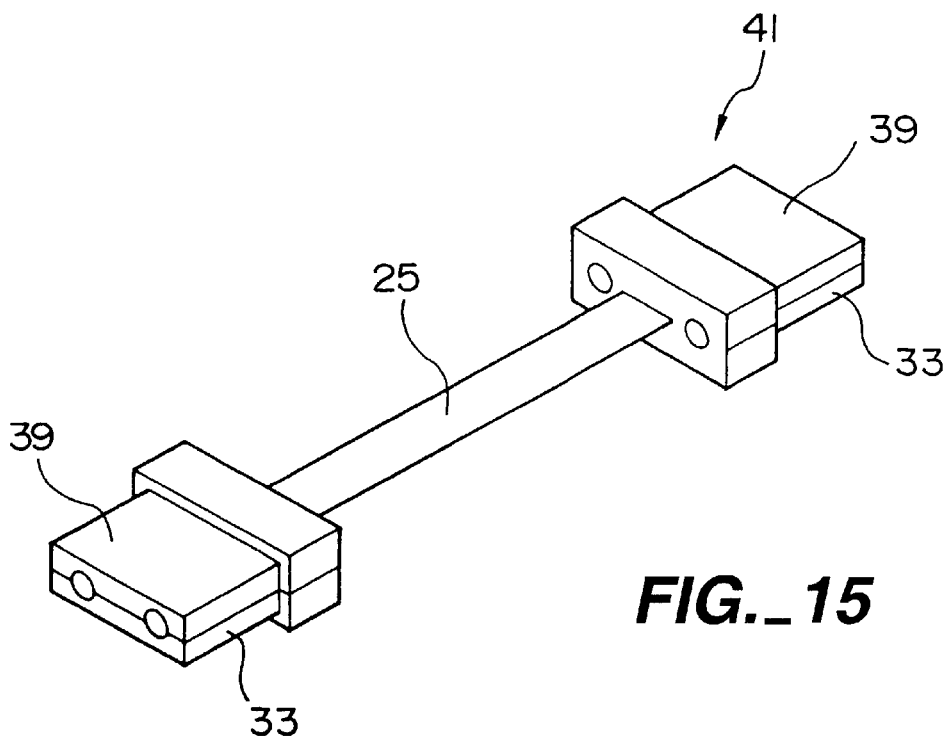
FIG._15
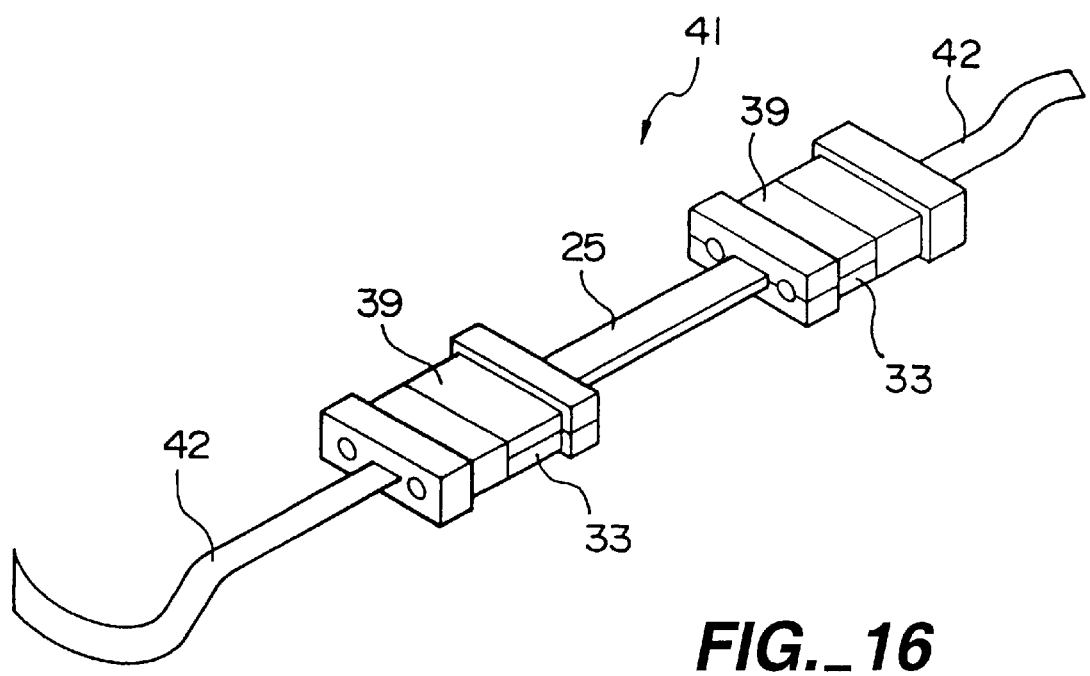
FIG._16

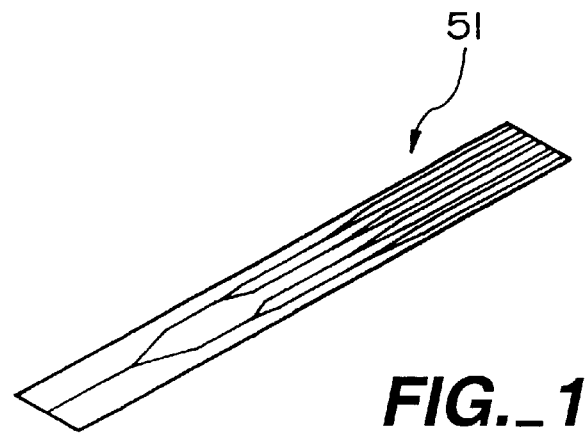
FIG._17A
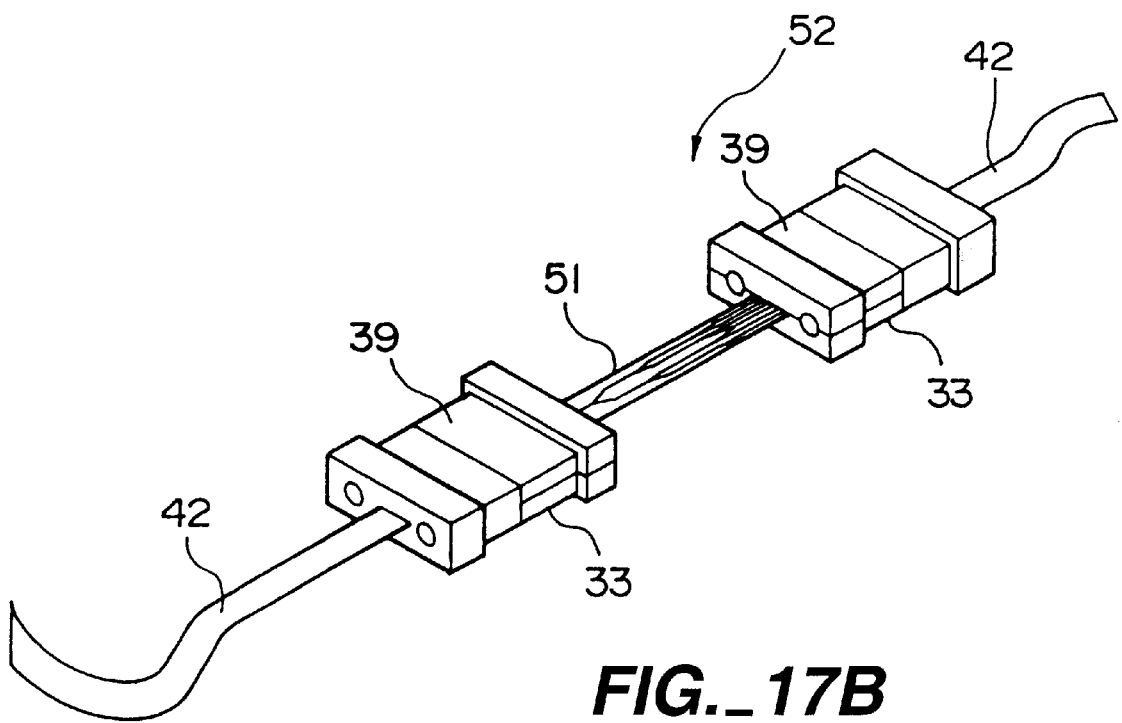
FIG._17B

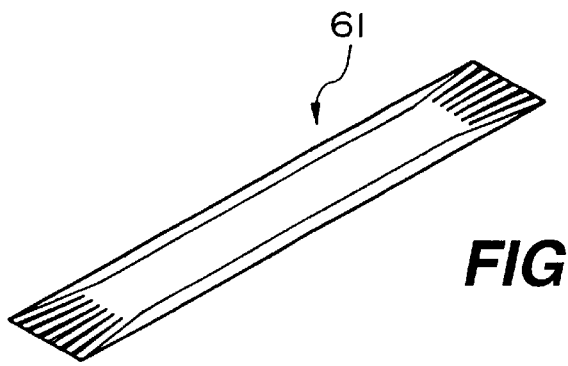
FIG._18A
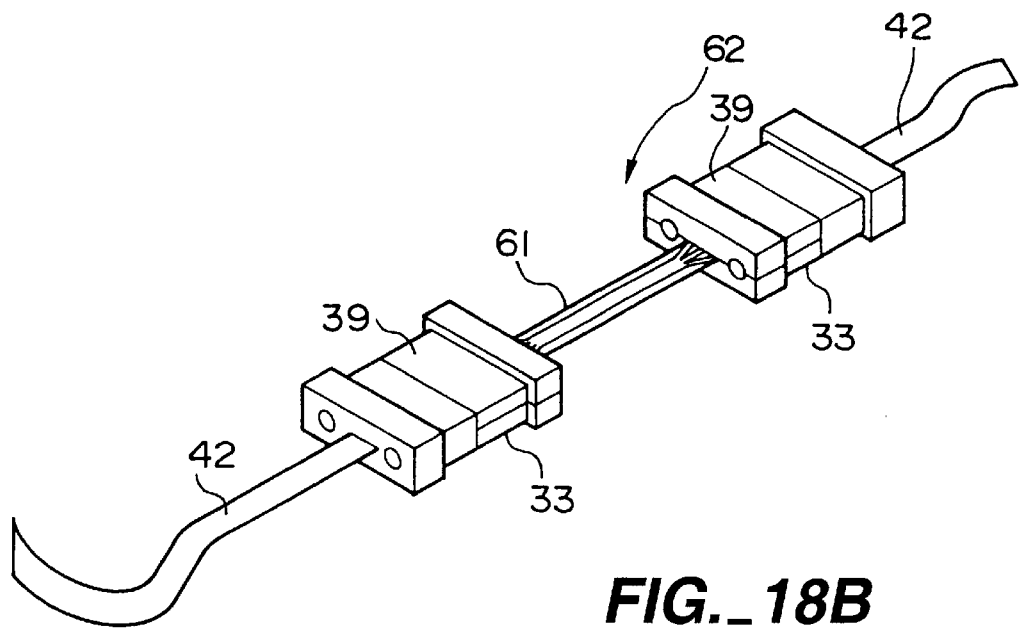
FIG._18B
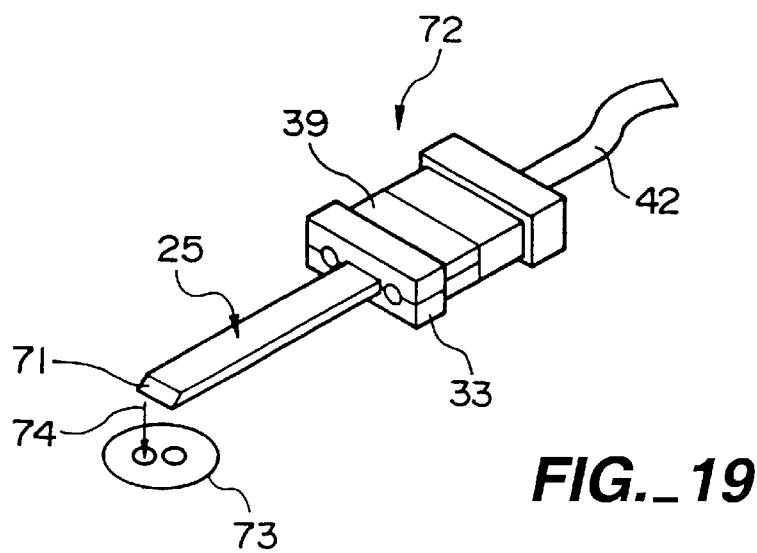
FIG._19

OPTICAL WAVEGUIDE DEVICE FOR OPTICAL WIRING AND MANUFACTURING METHOD THEREFOR

BACKGROUND OF THE INVENTION

1. Technical Field

The present invention relates to an optical waveguide device for optical wiring, and to a manufacturing method therefor, which is capable of simplifying the connection of various optical integrated circuits and optical devices and the like, which are employed in the fields of general optics and microoptics and in the fields of optical communications and optical data processing, and the connection of optical devices between boards when those devices are mounted on boards for use in wiring in the field of optical interconnection.

2. Related Art

In recent years, a great deal of research has been conducted into optical waveguides, which are employed in the fields of optical data processing and optical communications technologies, with the object of the integration, miniaturization, improvement in function, and reduction in cost of such optical waveguides. In one area of the optical communications field, in fact, silica system optical waveguide elements for use in optical wiring have reached the stage of practical application (reference document: Kawauchi Masao, NTT R&D, volume 43, number 11, page 101 (1994)).

Furthermore, research into polymeric waveguides, which employ inexpensive materials and allow for simplified production methods, have also been widely conducted. However, these optical waveguides have all been investigated with respect to the advantages of optical waveguide elements as optical parts, and there is almost no perception of such elements as optical wiring parts, and almost no research has been conducted in this area. For this reason, in optical wiring technologies for establishing connections between devices and between boards (optical interconnection), there have been almost no examples of the use of optical waveguides as optical parts for connecting optical device arrays such as various laser diodes (LD) or photodiodes (PD) or the like, or parallel planar optical waveguides, which have the function of conducting the branching and merging of waves. Optical fibers or optical fiber tapes are employed in this type of optical wiring. Examples of such optical fiber tape include, for example, optical fiber tapes provided at both ends with multiconductor optical connector plugs, and the like.

When the conventional optical fibers described above are employed, most such fibers are comprised of silica system glass, so that as a result of the properties of the material, cracking resulting from sudden bending, twisting, compression, torsion, or the like must be taken into account, and sufficient excess lengthmust be provided when the fibers are manufactured, and special methods are required for dealing with this excess length, so that the devices become larger and it becomes difficult to reduce the optical wiring boards and the like within devices to a compact size.

Furthermore, when optical fibers which are provided with multiconductor optical connector plugs at both ends thereof such as those conventional examples described above are employed, it is impossible to produce optical fiber tape which is provided with multiconductor optical connector plugs at both ends thereof in which the optical fiber portion is greatly shortened in order to reduce the length thereof. For this reason, it is necessary to provide a large amount of space on the boards for optical wiring, and this is inconvenient with respect to high density installation.

Furthermore, polymeric waveguides are optical wage guides which do possess flexibility; however, because there is no method for easily conducting optical connection with various devices, it is difficult to take advantage of this characteristic flexibility.

SUMMARY OF THE INVENTION

The present invention was created in light of the above circumstances; it has as an object thereof to provide an optical waveguide device for optical wiring, and a manufacturing method therefor, which is capable of easily and highly precisely connecting optical devices, planar optical waveguides, optical fibers, and the like on optical wiring boards, and moreover, is low in cost and is easy to manipulate.

The optical waveguide device for optical wiring of the present invention is provided with connectors which are connected to an optical fiber in an unaligned manner via guide pins, and a polymeric waveguide, which is a film-shaped optical waveguide; the connectors are joined to either both ends or one end of the polymeric waveguide, and the connectors comprise two connector parts arranged in facing position, and in the opposing faces of these optical connector parts, a polymeric waveguide loading groove for loading the polymeric waveguide and two guide pin loading grooves for loading the guide pins are formed, and the polymeric waveguide is sandwiched between the two connector parts, and the polymeric waveguide is joined to the two connector parts and this is made into a single unit.

In accordance with the optical waveguide device for optical wiring in the present invention, either both ends or one end of the polymeric waveguide is connected to a connector, so that it is a simple matter to carry out connection to an optical fiber. Accordingly, it is possible to connect optical devices, planar optical waveguides, optical fibers, and the like easily and with high precision. Moreover, the structure is simple, and it is possible to realize a reduction in cost, and the ease of manipulation is also increased.

Furthermore, the connector comprises two connector parts which are disposed in facing position, and a polymeric waveguide loading groove for loading the polymeric waveguide and two guide pin loading grooves for loading the guide pins are formed in the mutually opposing surfaces of the connector parts, and the polymeric waveguide is sandwiched between the two connector parts, so that it is possible to precisely and easily assemble the device by placing the polymeric waveguide in the polymeric waveguide loading groove and connecting the polymeric waveguide with the two connector parts.

The manufacturing method for the optical waveguide device optical wiring of the present invention is a manufacturing method for an optical waveguide device for optical wiring which is provided with connectors which are connected to an optical fiber in an unaligned manner via guide pins, and a polymeric waveguide, which is a film-shaped optical waveguide; the upper cladding or lower cladding of the polymeric waveguide is formed so that the distance from a line connecting the two guide pin loading grooves of the connector to the bottom surface of the polymeric waveguide loading groove is within 5 micrometers of the height to the center of the core of the polymeric waveguide, and the polymeric waveguide is formed so that the positional displacement in the horizontal direction between the center of the polymeric waveguide in the horizontal direction and the center of a line connecting the centers of the two guide pin loading grooves is 5 micrometers or less, and a connector is connected to one or both ends of the polymeric waveguide.

In accordance with the manufacturing method for the optical waveguide device for optical wiring of the present invention, it is possible to precisely control the film thickness of the lower cladding of the polymeric waveguide, and it is possible to precisely manufacture the width of the polymeric waveguide. Accordingly, it is possible to align the center of the core of the optical fiber which is connected with the center of the core of the polymeric waveguide with an accuracy of within 5 micrometers, and moreover, it is possible to produce an optical waveguide device for optical wiring in which the connection loss is limited to 0.2 dB or less.

BRIEF DESCRIPTION OF THE DRAWINGS

FIG. 1 is a process diagram showing a manufacturing method for optical waveguide devices for optical wiring in accordance with an embodiment of the present invention; (a) is an angled view of the optical waveguide device, while (b) is a front view of the part marked A of this device.

FIG. 2 is a process diagram showing a manufacturing method of the optical waveguide device for optical wiring of an embodiment of the present invention; (a) is a front view of the connector part, while (b) is a side view of the same part.

FIG. 3 is a process diagram showing a manufacturing method of the optical waveguide device for optical wiring of an embodiment of the present invention.

FIG. 4 is a process diagram showing a manufacturing method of the optical waveguide device for optical wiring of an embodiment of the present invention; (a) is a front view of the connector part, while (b) is a side view of this part.

FIG. 5 is a process diagram showing the manufacturing method of the optical waveguide device for optical wiring of an embodiment of the present invention.

FIG. 6 is a process diagram showing the manufacturing method of the optical waveguide device for optical wiring of an embodiment of the present invention.

FIG. 7 is an angled view of showing an optical deflector which is a modification of the optical waveguide device for optical wiring of an embodiment of the present invention.

FIG. 8 is a process diagram showing the manufacturing method of the optical part for optical wiring employing the optical waveguide for optical wiring of an embodiment of the present invention.

FIG. 9 is a process diagram showing the manufacturing method of the optical waveguide device for optical wiring of embodiment 1 of the present invention.

FIG. 10 is a process diagram showing the manufacturing method of the optical waveguide device for optical wiring of embodiment 1 of the present invention.

FIG. 11 is a process diagram showing the manufacturing method of the optical waveguide device for optical wiring of embodiment 1 of the present invention; (a) is a front view of the connector part, while (b) is a side view of this part.

FIG. 12 is a process diagram showing the manufacturing method of the optical waveguide device for optical wiring of embodiment 1 of the present invention.

FIG. 13 is a process diagram showing the manufacturing method of the optical waveguide device for optical wiring of embodiment 1 of the present invention.

FIG. 14 is a process diagram showing the manufacturing method of the optical waveguide device for optical wiring of embodiment 1 of the present invention.

FIG. 15 is a process diagram showing the manufacturing method of the optical waveguide device for optical wiring of embodiment 1 of the present invention.

FIG. 16 is an angled view showing the state in which an optical fiber provided with an MT connector having 8 conductors is connected to the optical waveguide device for optical wiring of embodiment 1 of the present invention.

FIG. 17 is a process diagram showing the manufacturing method of the optical waveguide device for optical wiring of embodiment 9 of the present invention; (a) is an angled view of a 1×8 branching waveguide, while (b) is an angled view of the optical waveguide device for optical wiring.

FIG. 18 is a process diagram showing the manufacturing method of the optical waveguide device for optical wiring of embodiment 9 of the present invention; (a) is an angled view of a 8×8 branching waveguide, while (b) is an angled view of the optical waveguide element for optical wiring.

FIG. 19 is an angled view showing the optical waveguide element for optical wiring of embodiment 11 of the present invention.

DESCRIPTION OF THE PREFERRED EMBODIMENTS

An embodiment of the optical waveguide device for optical wiring of the present invention, and the manufacturing method thereof, will be discussed based on the diagrams.

Hereinbelow, the manufacturing method of the optical waveguide device for optical wiring will be explained with reference to FIGS. 1 through 6.

First, the waveguide device (polymeric waveguide) 1 shown in FIG. 1 is prepared. In this waveguide device 1, a plurality of waveguides 3 are arranged in a row at a predetermined spacing within a flexible film 2. Reference 4 indicates the center of film 2, and the pitch t of waveguides 3 is 250 micrometers, while the width of the film is Z micrometers, and the height from the bottom surface of waveguide device 1 to the core center of the waveguides 3 is X micrometers, and the width of waveguides 3 is Y micrometers.

In waveguide device 1, the waveguides 3 have cores which comprise poly-methylmethacrylate (PMMA), or deuterated or partially deuterated poly-methylmethacrylate (PMMA), and the cladding comprises an ultraviolet rays cured resin or a deuterated poly-fluoromethacrylate, or alternatively, the core and cladding may comprise one of ultraviolet rays cured epoxy resin or silicone resin.

Next, the connector part 5 shown in FIG. 2 is prepared. This connector part 5 is constructed using a material which is optically transparent, such as glass, crystalline glass, or plastic or the like, and a waveguide loading groove 6 is formed in the center part of the upper surface thereof to a depth of X micrometers, while guide pin loading grooves 7 are formed at positions which are constantly separated from the center of the waveguide loading groove 6 by a distance of Z/2 micrometers. Next, as shown in FIG. 3, the waveguide device 1 is loaded into the waveguide loading groove 6 of connector part 5, and using an adhesive or the like, the waveguide device 1 is affixed to the connector part 5.

Next, as shown in FIG. 4, another connector part 8, which allows the assembly of the connector, is prepared. In the same way as the connector part 5 described above, this connector part 8 also comprises a material which is optically transparent, such as glass, crystalline glass, plastic, or the like, and a waveguide loading groove 6 is formed in the center part of the upper surface thereof, while guide pin loading grooves 7 are formed at positions separated by a constant distance of Z/2 micrometers from the center of the waveguide loading groove 6.

Next, as shown in FIG. 5, this connector part 8 is placed on top of connector part 5 so that the waveguide loading groove 6 and the guide pin loading grooves 7, 7 of the connector part 8 align with the waveguide loading groove 6 and the guide pin loading grooves 7, 7 of connector part 5, and these are affixed to one another.

Furthermore, as shown in FIG. 6, connector parts 5 and 8 are also affixed to the other end of waveguide device 1, and thus the waveguide device 11 for optical wiring of the present embodiment is obtained.

Furthermore, as shown in FIG. 7, if the connector parts 5 and 8 are affixed to only one end of the waveguide device 1, and the other end la is processed using a micromiller and is angled and rendered with a mirror finish, then the light propagated through the optical fibers is reflected at the mirrored surface and the optical path thereof is changed, thus resulting in an optical deflector 12.

It is possible to produce this waveguide device 1 using the spin coating method with an accuracy of 1 micrometer, and it is possible to keep the difference between the height (X micrometers) from the bottom surface to the top surface of the waveguide loading groove 6 in the attached connector part 5 and the height from the bottom surface of waveguide device 1 to the core center of the waveguides 3 to within 5 micrometers. Furthermore, the width of waveguide device 1 may be cut to an accuracy within 3 micrometers with respect to the predetermined value by means of using a dicing saw machine, so that it is possible to make this approximately agree with the width of the waveguide loading groove 6.

The waveguide loading groove 6 is formed at a central position between the centers of the guide pin loading grooves 7, 7, so that if the waveguide device 1 is cut to an accuracy of within 3 micrometers with respect to the predetermined width (Z/2) from the center 4 of the waveguide, using a dicing saw machine, then simply by affixing the waveguide device 1 in the waveguide loading groove 6, it is possible to restrict the positional displacement between the center of the waveguide device 1 in the horizontal direction and the center of a line connecting the centers of the guide pin loading grooves 7, 7 of connector parts 5 and 8 to within 5 micrometers. Such connectors provided with guide pin loading grooves facilitate connection with optical fibers which are provided with multiconductor MT connectors by setting the pin diameters and pin spacings to standard values.

As shown in FIG. 8, by attaching this waveguide device 11 for optical wiring in concave parts 14 formed in the upper surface of a holder board 13, so that the edges of connector parts 5 and 8 are exposed, and attaching an upper lid 15 on the holder board 13, it is possible to produce an optical part 16 for optical wiring.

With this optical part 16 for optical wiring, optical connection which is compact and is extremely easy to handle is made possible.

The use of deuterated or partially deuterated PMMA or ultraviolet rays cured epoxy resin for the core and the cladding of waveguide device 1 is advantageous in that it results in a low loss. Furthermore, metals, ceramics, glass, and plastic may be used as the connector materials; among these, glass containing crystalline glass or plastic are low cost and hence advantageous. In particular, among the plastic materials, resin compositions which have epoxy resin or phenol resin or the like as a chief component and further contain curing promotion agents or silica granules (filler) or the like are preferably employed. By molding these resin compositions using an injection molding machine or a transfer molding machine or the like, molded parts having a dimensional accuracy of 5 micrometers or less can be obtained.

Next, the present invention will be explained in detailed based on embodiments.

(Embodiment 1)

First, as shown in FIG. 9, on a substrate 21, an epoxy resin having a refractive index of 1.47 at a wavelength of 0.85 micrometers is applied, and this is made into a lower cladding 22 having a thickness of 30 micrometers. Next, 40 micrometers of deuterated PMMA is applied and this forms a core layer 23. After this, by means of a method in which reactive ion etching and photolithography are combined, a plurality of ridge patterns having a height of 40 micrometers and a width of 40 micrometers are formed in core layer 23. Furthermore, an epoxy resin having a refractive index of 1.47 at a wavelength of 0.851 micrometers is applied on the core ridges 23a formed in this way, and this forms an upper cladding 24 having a thickness of 50 micrometers.

By means of this process, the distance from the upper part of substrate 21 to the center of core ridges 23a is 50 micrometers. This is a multimode waveguide. Here, when the insertion loss was measured, it was found to be less than or equal to 0.1 dB at a wavelength of 0.85 micrometers, and less than or equal to 0.5 dB at a wavelength of 1.3 micrometers.

Next, this optical waveguide is cut to a length of 5 cm by means of a dicing saw machine, and the cut optical waveguide is peeled away from the substrate 21, and thus a film-shaped optical waveguide device 25 having a thickness of 120 micrometers, a width of 3 mm, and a length of 50 mm was obtained (FIG. 10). Furthermore, the polarization dependence of the insertion loss was 0.1 dB or less at a wavelength of 1.3 micrometers.

Next, as shown in FIGS. 11 and 12, a connector part 33 having a single waveguide loading groove 31 having a depth of 50 micrometers, a width of 3 mm, and a length of 8 mm, and two guide pin loading grooves 32, having a depth of 350 micrometers, a width of 1 mm, and length of 8 mm, was prepared.

Adhesive holding grooves 34, 34, having a depth of 100 micrometers, a width of 100 micrometers, and a length of 8 mm, were formed in the connector part 33 in order to prevent the deposition of excess adhesive on the upper surface, and the protrusion of optical waveguide 25.

Next, as shown in FIG. 13, the optical waveguide device 25 was placed on the waveguide loading groove 31 of connector part 33, and this was affixed using adhesive.

Next, as shown in FIG. 14, a connector part 39 having a single waveguide loading groove 37, with a depth of 50 micrometers and a length of 8 mm, and two guide pin loading grooves 38, having a depth of 350 micrometers, a width of 1 mm, and a length of 8 mm, was prepared, and the connector part 39 was affixed to the connector part 33.

Next, as shown in FIG. 15, connector parts 33 and 39 were also affixed to other end of optical waveguide device 25 to produce a waveguide device 41 for optical wiring.

Next, as shown in FIG. 16, optical fibers 42 provided with 8-conductor MT connectors were connected to both ends of waveguide device 41 for optical wiring via guide pins, and the insertion loss at a wavelength of 0.85 micrometers was found to be approximately 0.3 dB or less, while the connection loss was 0.1 dB or less, and the variation in connection loss among the 8 conductors was 0.1 dB or less.

(Embodiment 2)

In this embodiment, a single-mode optical device was produced.

First, an epoxy resin having a refractive index of 0.47 at a wavelength of 0.85 micrometers was prepared, and this was made into a lower cladding having a thickness of 25 micrometers. Next, 20 micrometers of deuterated polyfluoromethacrylate was applied and formed into a lower cladding layer. Next, 10 micrometers of deuterated PMMA was applied to form a core layer. After this, by means of a process in which reactive ion etching and photolithography were combined, a ridge pattern with a height of 10 micrometers and a width of 8 micrometers was formed.

20 micrometers of deuterated poly-fluoromethacrylate was applied on the ridge pattern obtained to form an upper cladding layer. Furthermore, an epoxy resin having a refractive index of 1.47 at a wavelength of 0.5 micrometers was applied and an upper cladding having a thickness of 25 micrometers was formed.

This optical waveguide was cut to a length of 5 cm and a width of 3 mm using a dicing saw machine, and when the insertion loss was measured, it was found to be 0.5 dB or less at a wavelength of 1.3 micrometers, so that at a wavelength of 1.3 micrometers, this was a single mode waveguide. Furthermore, the insertion loss polarization dependence was 0.1 dB or less even at a wavelength of 1.3 micrometers. Next, this optical waveguide was peeled off of the substrate, and a film-shaped optical waveguide device similar to that of embodiment 1 was obtained.

Next, an optical waveguide device for optical wiring was produced by a method identical to that of embodiment 1. Here, optical fibers provided with 8-conductor MT connectors were connected to this optical waveguide device for optical wiring via guide pins in the same manner as in embodiment 1, and the insertion loss at a wavelength of 1.3 micrometers was found to be approximately 1.0 dB, or less, and the connection loss was found to be 0.3 dB or less, and the connection loss variation among the eight conductors was found to be 0.1 dB or less.

(Embodiment 3)

In the present embodiment, a single-mode waveguide device was produced using silicone resin.

First, an ultraviolet rays cured epoxy resin having a refractive index of 1.47 and a wavelength of 0.85 micrometers was prepared, and this ultraviolet rays cured epoxy resin was applied on a silicon substrate by means of a spin coating method. The thickness of the film was 27 micrometers. After this, ultraviolet rays were applied to this ultraviolet rays cured epoxy resin and the resin was cured, and this formed a lower protective layer with respect to the silicone resin optical waveguide.

Next, 20 micrometers of a thermally crosslinking silicon oligomer (I) was applied on this lower protective layer. After this, this was heated for two hours at a temperature of 200-C. and thermal crosslinking was conducted, and this formed a lower cladding layer. Next, 7 micrometers of a thermally crosslinking silicon oligomer (II) having a refractive index which was 0.6% greater than that of the thermally crosslinking silicon oligomer (I) at a wavelength of 1.55 micrometers was applied. After this, heating was conducted for a period of 2 hours at a temperature of 200-C. and thermal crosslinking was conducted, and this formed a core layer.

After this, by means of a method combining reactive ion etching and photolithography employing a mixed gas of oxygen and tetrafluoroethylene, a ridge pattern with a height of 7 micrometers and width of 7 micrometers was produced.

Next, in the same manner as the lower cladding layers described above, 20 micrometers of the thermally crosslinking silicon oligomer (I) was applied on the core ridges obtained. After this, heating was conducted for a period of two hours at a temperature of 200-C. and thermal crosslinking was carried out, and this formed an upper cladding layer.

Furthermore, a ultraviolet rays cured epoxy resin having a refractive index identical to that of the lower protective layer described above was applied to the upper cladding layer, and this ultraviolet rays cured epoxy resin was irradiated with ultraviolet rays and cured, and this formed an upper productive layer having a thickness of 25 micrometers.

This optical waveguide was cut to a length of 5 cm and a width of 3 mm using a dicing saw machine, and when the insertion loss was measured, it was found to be 2.5 dB or less at a wavelength of 1.55 micrometers, and thus this was a single mode waveguide at a wavelength of 1.3 micrometers. Next, this optical waveguide was peeled off of the silicon substrate, and a film-shaped optical waveguide device 25 similar to that of embodiment 1 was obtained.

Next, an optical waveguide device 41 for optical wiring was produced by means of a method identical to that of embodiment 1. Here, in the same way as in embodiment 1, single-mode optical fibers provided with 8-conductor MT connectors were connected to the optical waveguide device 41 for optical wiring via guide pins, and the insertion loss at a wavelength of 1.55 micrometers was found to be approximately 3 dB or less, while the connection loss was found to be 0.5 dB or less.

(Embodiment 4)

In the present embodiment, epoxy resin was used for both the core and the cladding, and a multimode optical waveguide was produced.

Epoxy resin having a refractive index of 1.47 at a wavelength of 0.85 micrometers was prepared, and this formed a lower cladding having a thickness of 30 micrometers. Next, 40 micrometers of epoxy resin having a refractive index of 1.52 was applied, and this formed a core layer. After this, by means of a method combining reactive ion etching and photolithography, a ridge pattern having a height of 40 micrometers and a width of 40 micrometers was formed. Epoxy resin having a refractive index of 1.47 at a wavelength of 0.85 micrometers was applied on the core ridges obtained, and an upper cladding having a thickness of 50 micrometers was thus obtained.

By means of this process, the distance from the upper part of the substrate to the center of the cores was 50 micrometers, and a multimode waveguide film having a thickness of 120 micrometers, a width of 3 mm, and a length of 5 cm, was obtained. Next, this optical waveguide was affixed in the manner of embodiment 1 to form an optical waveguide device for optical wiring.

Optical fibers provided with four-conductor MT connectors were connected to the optical waveguide device for optical wiring via guide pins, and the insertion loss at a wavelength of 0.85 micrometers was found to be approximately 0.7 dB or less, while the connection loss was found to be 0.1 dB or less, and the variation in the connection loss among the four conductors was found to be 0.1 dB or less.

(Embodiment 5)

In this embodiment, Pyrex glass was used in the connector parts 33 and 39 in embodiment 4. Furthermore, an UV-curable adhesive was used for the affixing of optical waveguide device 25 to waveguide loading groove 37, and for the affixing of connecting parts 33 and 39.

Optical fibers provided with 8-conductor MT connectors were connected to the optical waveguide device for optical wiring obtained in this manner via guide pins, and the insertion loss at a wavelength of 0.85 micrometers was found to be approximately 0.7 dB, while the connection loss was found to be 0.1 dB or less, and the connection loss variation among the 8 conductors was found to be 0.1 dB or less.

(Embodiment 6)

In the present embodiment, transparent plastic was employed as the material for connector parts 33 and 39, and except for this, everything else was as in embodiment 5 described above.

Optical fibers provided with 8-conductor MT connectors were connected to the optical waveguide device for optical wiring obtained in this manner via guide pins, and the insertion loss at a wavelength of 0.85 micrometers was found to be approximately 0.7 dB, while the connection loss was found to be 0.1 dB or less, and the connection loss variation among the 8 conductors was found to be 0.1 dB or less.

(Embodiment 7)

In the present embodiment, crystalline glass was employed as the material for connector parts 33 and 39 in embodiment 6 described above, and an optical waveguide device for optical wiring was obtained.

Optical fibers provided with 8-conductor MT connectors were connected to this optical waveguide device for optical wiring via guide pins, and the insertion loss at a wavelength of 0.85 micrometers was found to be approximately 0.7 dB, while the connection loss was found to be 0.1 dB or less, and the connection loss variation among the 8 conductors was found to be 0.1 dB or less.

(Embodiment 8)

In the present embodiment, the connector part 33 shown in FIG. 12 and the connector part 39 shown in FIG. 14 were manufactured using the injection molding method.

The waveguide loading groove 31 of connector part 33 and the waveguide loading groove 37 of connector part 39 both have a depth of 50 micrometers, a width of 3 mm, and a length of 8 mm, while the guide pin loading grooves 32 of connector part 33 and the guide pin loading grooves 38 of connector part 39 all have a depth of 350 micrometers, a width of 1 mm, and a length of 8 mm.

The molding method of these connector parts 33 and 39 was as follows.

A resin composition containing 100 parts per weight of epoxy resin, 100 parts by weight of phenol resin, 5 parts by weight of a curing promotion agent (isocyanate compound), and 550 parts by weight of silica granules was used as the material. The metal mold used here was one in which hardened steel is precisely molded, and this was then worked to a dimensional accuracy of 0.5 micrometers or less.

This resin composition was injection molded using the metal mold described above. The molding was conducted under conditions such that the clamping pressure was 40 tons, the injection volume was 30 cm3, and the injection pressure was 1.5 tons/cm2, and the resin composition described above was supplied to an injection molding machine, and molding was conducted at a mold temperature of 190-C., for an injection period of 20 seconds, with a curing time of 30 seconds, and at an injection pressure of 700 kg/cm2. After this, this molded product was heat-treated at 190-C. for 90 minutes, and connector parts 33 and 39 having a dimensional accuracy of 5 micrometers or less were obtained.

The optical waveguide having a length of 5 cm which was produced in embodiment 4 was affixed to connector parts 33 and 39 obtained in this manner using an ultraviolet rays cured adhesive in a manner similar to that of embodiment 1, and a waveguide device for optical wiring was obtained.

Here, this waveguide device for optical wiring was connected to optical fibers provided with 8-conductor MT connectors via guide pins, and the insertion loss at a wavelength of 0.85 micrometers was found to be approximately 0.7 dB, while the connection loss was 0.1 dB or less, and the connection loss variation among the 8 conductors was 0.1 dB or less.

(Embodiment 9)

The 1×8 branching waveguide 51 having a length of 5 cm shown in FIG. 17(*a*), which was produced in accordance with the method of embodiment 4, was used as the waveguide device, and an optical waveguide device 52 for optical wiring having connector parts 33 and 39 attached to both ends thereof in the manner of embodiment 1 was obtained (FIG. 17(*b*)).

Furthermore, optical fibers 42 provided with 8-conductor MT connectors were connected to this optical waveguide device 52 for optical wiring via guide pins, and the insertion loss at a wavelength of 0.85 micrometers was approximately 10 dB, including the branching loss, while the connection loss was 0.1 dB or less, and the variation in the output light of the 8 conductors was 0.2 dB or less.

(Embodiment 10)

The 8×8 branched waveguide 61 having a length of 5 cm shown in FIG. 18(*a*), which was produced in accordance with the method of embodiment 4, was used as the waveguide device, and an optical waveguide device 62 for optical wiring was obtained in which connector parts 33 and 39 were attached to both ends in the manner of embodiment 1 (FIG. 18(*b*)).

Furthermore, optical fibers 42 provided with 8-conductor MT connectors were connected to this optical waveguide device 62 for optical wiring via guide pins, and the insertion loss at a wavelength of 0.85 micrometers was approximately 10 dB, while the connection loss was 0.1 dB or less, and the variation in the output light of the 8 conductors was 0.2 dB or less.

(Embodiment 11)

An optical waveguide device 25 was prepared in a manner similar to that of embodiment 1, and as shown in FIG. 19, connector parts 33 and 39 were provided on one end of the waveguide device 25, and a 45-mirror 71 was formed on the other end, and a optical waveguide device 72 for optical wiring was produced.

Furthermore, a optical fiber 42 provided with an 8-conductor MT connector was connected to the optical waveguide device 72 for optical wiring via guide pins, and the light 74, the optical path of which was deflected, was collected by a collecting device 73 positioned below, and the loss thereof was measured, and it was determined that the insertion loss at a wavelength of 0.85 micrometers was approximately 1.5 dB, while the connection loss was 0.1 dB or less, and the variation in the output light of the 8 conductors was 0.2 dB or less.

In the embodiments described above, ultraviolet rays cured adhesive was used when attaching connector parts 33 and 39; however, heat-curable adhesive may also be employed.

Furthermore, it is of course the case that polyimides, silicone resins, polycarbonate resins, and the like, maybe used as the waveguide material.

Furthermore, direct lines, branching devices, and star couplers were shown as examples of the waveguide of the present invention; however, it is also possible to realize directional connecting devices and joining and branching wave devices.

What is claimed is:

1. An optical waveguide device for optical wiring which is provided with:
   connectors connected to optical fibers in nonalignment via guide pins, and a polymeric waveguide; wherein
   said connectors are joined to edges of said polymeric waveguide,
   said polymeric waveguide comprises a plurality of multimode waveguides;
   said polymeric waveguide is formed by a method comprising the steps of:
   making said waveguide on a substrate; and
   separating said waveguide from said substrate to be used as an independent and flexible film-shaped optical waveguide,
   said plurality of multimode waveguides are arranged in a row within said film-shaped optical waveguide,
   said connectors are formed by two connector parts disposed in facing position, and in surfaces of these connector parts which are in facing position, a single polymeric waveguide loading groove for loading said polymeric waveguide, and two guide pin loading grooves for loading said guide pins are formed, and
   an adhesive layer is present between said polymeric waveguide and each of said two connector parts so that said polymeric waveguide and said two connector parts are joined and associated in a unitary manner.

2. An optical waveguide device for optical wiring in accordance with claim 1, wherein
   said plurality of multimode waveguides comprise branching waveguides.

3. An optical waveguide device for optical wiring in accordance with claim 1, wherein
   said connectors are connected to both end or one end of said polymeric waveguide.

4. An optical waveguide device for optical wiring in accordance with claim 1, wherein
   one of said connectors is joined to one edge of said polymeric waveguide, and a mirror is formed on the other edge thereof.

5. An optical waveguide device for optical wiring in accordance with claim 1, wherein
   the core of said polymeric waveguide comprises either poly-methylmethacrylate or deuterated or partially deuterated poly-methylmethacrylate,
   and the cladding comprises ultraviolet rays cured resin or deuterated poly-fluoromethacrylate.

6. An optical waveguide device for optical wiring in accordance with claim 1, wherein
   the core and cladding of said polymeric waveguide comprises ultraviolet rays cured epoxy resin or silicone resin.

7. An optical waveguide device for optical wiring in accordance with claim 6, wherein
   said silicone resin comprises thermally crosslinking silicone resin.

8. An optical waveguide device for optical wiring in accordance with claim 1, wherein
   each of said connectors comprises a material which is optically transparent.

9. An optical waveguide device for optical wiring in accordance with claim 8, wherein
   said material comprises one selected from a group containing glass, microcrystalline glass, and plastic.

10. An optical waveguide device for optical wiring in accordance with claim 9, wherein
    said glass comprises Pyrex glass.

11. An optical waveguide device for optical wiring in accordance with claim 1, wherein
    said connector is formed by an injection molding method or a transfer molding method.

* * * * *